(12) United States Patent
Johnston et al.

(10) Patent No.: US 10,699,227 B2
(45) Date of Patent: Jun. 30, 2020

(54) WORKFORCE STRATEGY INSIGHTS

(71) Applicant: Accenture Global Solutions Limited, Dublin (IE)

(72) Inventors: Simon Peter Johnston, Dublin (IE); Brianne Mulvihill, Dublin (IE); Rebecca Kearney, Dublin (IE); Freddy Lecue, Dublin (IE)

(73) Assignee: Accenture Global Solutions Limited, Dublin (IE)

( * ) Notice: Subject to any disclaimer, the term of this patent is extended or adjusted under 35 U.S.C. 154(b) by 503 days.

(21) Appl. No.: 15/185,997

(22) Filed: Jun. 17, 2016

(65) Prior Publication Data
US 2017/0364850 A1 Dec. 21, 2017

(51) Int. Cl.
*G06Q 10/06* (2012.01)
*G06Q 10/10* (2012.01)

(52) U.S. Cl.
CPC .......... *G06Q 10/06313* (2013.01); *G06Q 10/063118* (2013.01); *G06Q 10/103* (2013.01)

(58) Field of Classification Search
CPC .............................. G06Q 10/00; G06Q 30/02
USPC ................................................ 705/7.11–7.42
See application file for complete search history.

(56) References Cited

U.S. PATENT DOCUMENTS

| | | | |
|---|---|---|---|
| 6,742,002 B2 | 5/2004 | Arrowood | |
| 6,853,975 B1 | 2/2005 | Dirksen et al. | |
| 7,114,648 B2 | 10/2006 | Ginskey et al. | |
| 7,483,842 B1 | 1/2009 | Fung et al. | |
| 7,587,678 B1 | 9/2009 | English et al. | |
| 8,149,126 B2 | 4/2012 | Little et al. | |
| 8,306,843 B1 | 11/2012 | Price et al. | |
| 8,626,698 B1 * | 1/2014 | Nikolaev | G06Q 10/06393 705/7.17 |
| 8,744,904 B2 | 6/2014 | Lindia et al. | |
| 9,256,711 B2 | 2/2016 | Horseman | |
| 9,563,919 B2 | 2/2017 | Brown et al. | |

(Continued)

OTHER PUBLICATIONS

Hu et al., Statistical Methods for automated generation of service engagement staffing plans, 2007, IBM, pp. 281-293.*

(Continued)

*Primary Examiner* — Robert D Rines
(74) *Attorney, Agent, or Firm* — Fish & Richardson P.C.

(57) ABSTRACT

Methods, systems, and apparatus, including computer programs encoded on a computer storage medium, for workforce planning. The methods, systems, and apparatus include actions of obtaining historical project data describing previous projects, generating a knowledge graph based at least on the historical project data, obtaining future project data describing a future project, identifying a particular previous project that matches the future project based at least on the knowledge graph and the data describing the future project, generating similarity scores between the previous projects and the future project, determining that the similarity score between the particular previous project and the future project satisfies a similarity threshold, identifying the particular previous project as matching the future project, identifying personnel for the future project based at least on the skills needed for the particular previous project, and generating a resource plan for the future project based at least on the identified personnel.

19 Claims, 4 Drawing Sheets

(56) References Cited

U.S. PATENT DOCUMENTS

| | | | |
|---|---|---|---|
| 2009/0006173 A1* | 1/2009 | Farrell | G06Q 10/06 |
| | | | 705/7.13 |
| 2009/0125359 A1* | 5/2009 | Knapic | G06F 9/542 |
| | | | 705/7.23 |
| 2010/0174577 A1* | 7/2010 | Duffy | G06Q 10/06311 |
| | | | 705/7.14 |
| 2010/0332281 A1* | 12/2010 | Horvitz | G06Q 10/06311 |
| | | | 705/7.13 |
| 2011/0071875 A1* | 3/2011 | Stenhaug | G06Q 10/06 |
| | | | 705/7.36 |
| 2012/0197674 A1* | 8/2012 | Rahmouni | G06Q 10/063 |
| | | | 705/7.11 |
| 2013/0218619 A1* | 8/2013 | Friedlander | G06Q 10/06311 |
| | | | 705/7.14 |
| 2013/0218625 A1 | 8/2013 | Duquette et al. | |
| 2016/0071035 A1* | 3/2016 | Chee | G06Q 10/0635 |
| | | | 705/7.28 |
| 2016/0292621 A1* | 10/2016 | Ciccone | G06Q 10/06311 |

OTHER PUBLICATIONS

Australian Office Action for Application No. 2017203794, dated Nov. 14, 2017, 5 pages.

* cited by examiner

WORKFORCE STRATEGY INSIGHTS

BACKGROUND

Information about a workforce, past projects, and future projects may be stored. For example, a system may store data that describes skills possessed by each member of a workforce and data that describes projects that have already been completed and upcoming projects.

SUMMARY

In general, an aspect of the subject matter described in this specification may involve a system for workforce planning. In making plans for a workforce, the system may obtain data describing projects that were previously completed. The data for each project may describe timing of completion of the project, costs associated with the project, and skills used on the project. The system may generate a knowledge graph representing the previously completed projects. When the system receives data regarding a new project, the system may use the knowledge graph to identify a completed project that matches the new project. The system may then generate a plan for completing the new project based at least on the timing of completion, costs, and skills for the completed project. Implementations of the present disclosure are generally directed to a platform.

In some aspects, the subject matter described in this specification may be embodied in methods that may include the actions of obtaining, from a database, historical project data describing previous projects, generating a knowledge graph based at least on the historical project data, where the knowledge graph represents relationships between the previous projects and skills needed for the previous projects, and obtaining future project data describing a future project. Additional actions include generating similarity scores between the previous projects and the future project based on the knowledge graph and the data describing the future project, determining that the similarity score between the particular previous project and the future project satisfies a similarity threshold, and, in response to determining that the similarity score between the particular previous project and the future project satisfies the similarity threshold, identifying the particular previous project as matching the future project. Further actions include identifying personnel for the future project based at least on the skills needed for the particular previous project and generating a resource plan for the future project based at least on the identified personnel.

Other versions include corresponding systems, apparatus, and computer programs, configured to perform the actions of the methods, encoded on computer storage devices.

These and other versions may each optionally include one or more of the following features. For instance, in some implementations determining that the similarity score between the particular previous project and the future project satisfies a similarity threshold includes determining that (i) the similarity score between the particular previous project and the future project is greater than or equal to the similarity score between other previous projects indicated by the knowledge graph and the future project and (ii) the similarity score between the particular previous project and the future project satisfies the similarity threshold, where identifying personnel for the future project based at least on the skills needed for the particular previous project comprises in response to determining that (i) the similarity score between the particular previous project and the future project is greater than or equal to the similarity score between other previous projects indicated by the knowledge graph and the future project and (ii) the similarity score between the particular previous project and the future project satisfies the similarity threshold, identifying the particular previous project as matching the future project.

In certain aspects, generating similarity scores between the previous projects and the future project based on the knowledge graph and the data describing the future project includes, for each pair of a previous project and the future project, determining a semantic distance between the previous project and the future project.

In some aspects, generating a knowledge graph based at least on the historical project data, where the knowledge graph represents relationships between the previous projects and skills needed for the previous projects includes identifying a set of the historical project data corresponds to the particular previous project, identifying skills referenced by the set of the historical project data, and including, in the knowledge graph, a node that represents the particular previous project, nodes that represent the identified skills, and edges between the node that represents the particular previous project and the nodes the represent the identified skills that represent relationships between the particular previous project and the identified skills.

In some implementations, identifying personnel for the future project based at least on the skills needed for the particular previous project includes obtaining personnel data that describes skills possessed by personnel and future availability of the personnel and identifying, based on the personnel data, a set of personnel that at least a portion of the skills needed for the particular previous project that are available while work is to be performed for the future project.

In certain aspects, identifying, based on the personnel data, a set of personnel that at least a portion of the skills needed for the particular previous project that are available while work is to be performed for the future project includes reducing cost for the personnel while increasing coverage of skills needed for the particular previous project. In some aspects, actions include identifying skills that are needed for the future project that are not needed for the particular previous project, where identifying personnel for the future project based at least on the skills needed for the particular previous project includes identifying personnel for the future project based at least on the skills needed for the particular previous project and the skills that are identified as (i) needed for the future project and (ii) not needed for the particular previous project.

In some aspects, generating a resource plan for the future project based at least on the identified personnel includes generating data that describes that the identified personnel are recommended for working on the future project, describe skills that are not satisfied by the identified personnel but available within a company, and skills that are not available within the company. In some implementations, actions include providing the resource plan for display to a user. In certain aspects, actions include providing an exemplar electronic document based on the resource plan for display to a user in a graphical user interface. In some aspects, generating a knowledge graph based at least on the historical project data, where the knowledge graph represents relationships between the previous projects and skills needed for the previous projects includes generating the knowledge graph based at least on the historical project data, and external data from relationships between skills and projects, where the knowledge graph represents relationships between the previous projects and skills needed for the previous internal and external projects.

One technical advantage may be more efficient and scalable evaluation using a knowledge graph. For example, the system may use semantic similarity metric in a knowledge graph to efficiently evaluate semantic differences of entities in a knowledge graph in a scalable manner.

The details of one or more implementations of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Implementations of the present disclosure are generally directed to a platform for workforce planning where data regarding previous projects can be used to plan a workforce for a new project. In some examples, the platform may obtain data about previous projects and the new project from a variety of different sources, and normalize the obtained data to match the new project with a previous project. More particularly, implementations of the present disclosure are directed to obtaining historical project data describing previous projects, generating a knowledge graph based at least on the historical project data, where the knowledge graph represents relationships between the previous projects and skills needed for the previous projects, obtaining future project data describing a future project, identifying a particular previous project that matches the future project based at least on the knowledge graph and the data describing the future project, identifying personnel for the future project based at least on the skills needed for the particular previous project, and generating a resource plan for the future project based at least on the identified personnel.

In some examples, similarity scores between the previous projects and the future project are generated based on semantic distances in the knowledge graph and a determination is made whether (i) the similarity score between the particular previous project and the future project is greater than or equal to the similarity score between other previous projects indicated by the knowledge graph and (ii) the future project and the similarity score between the particular previous project and the future project satisfies a similarity threshold. Similarity may refer to semantic similarity between entities input from a knowledge graph. In some examples, in response to determining that (i) the similarity score between the particular previous project and the future project is greater than or equal to the similarity score between other previous projects indicated by the knowledge graph and (ii) the future project and the similarity score between the particular previous project and the future project satisfies a similarity threshold, a set of personnel are identified for the future project based on the skills needed for the particular previous project and a resource plan is generated indicating the set of personnel and any skills needed for the future project that are not covered by the set of personnel.

Figure 1:
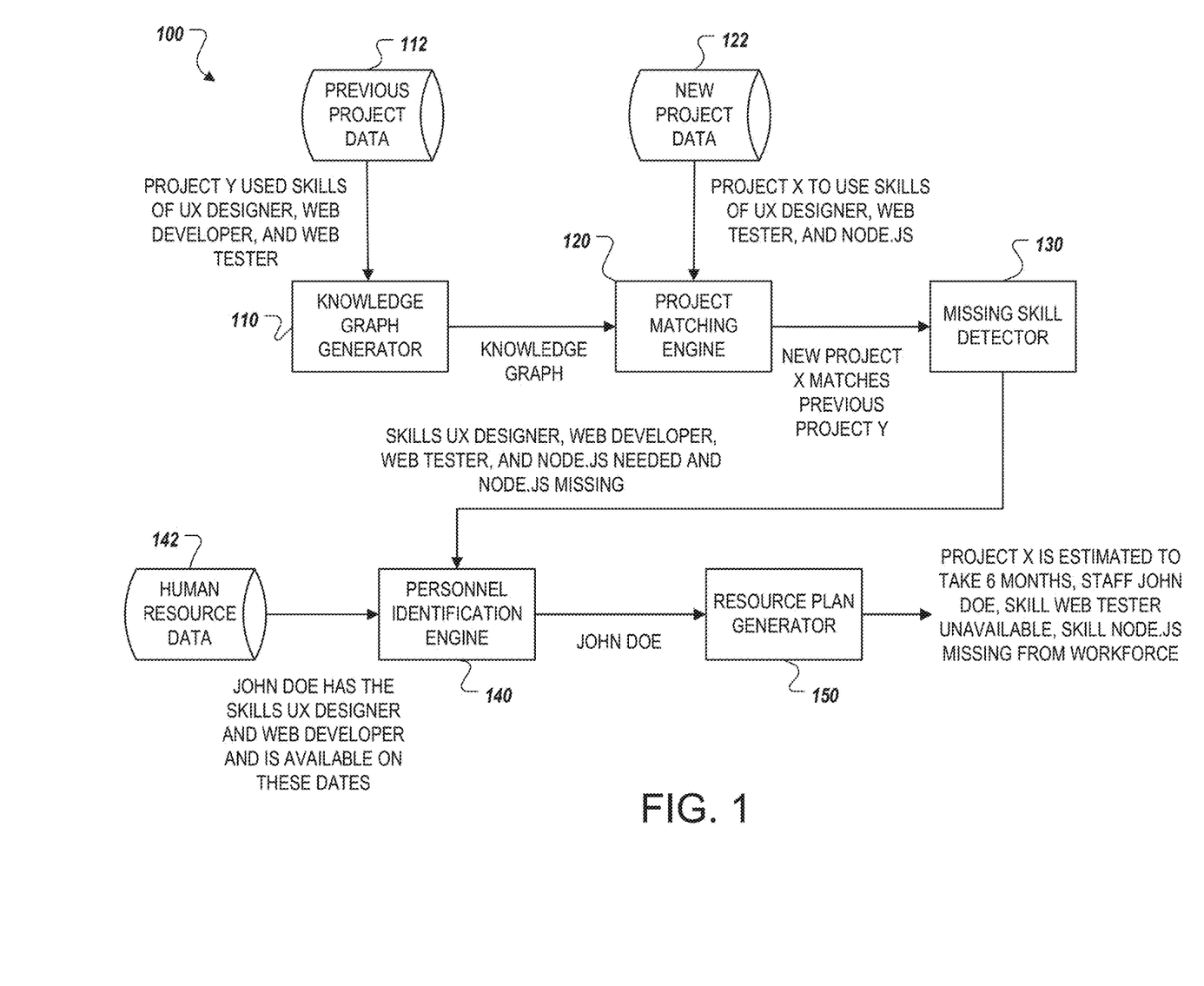
FIG. 1 is a block diagram of an example system that can execute implementations of the present disclosure.

FIG. 1 is a block diagram of an example system 100 that can execute implementations of the present disclosure. Briefly, and as described in further detail below, the system 100 may include a knowledge graph generator 110, a project matching engine 120, a missing skill detector 130, a personnel identification engine 140, and a resource plan generator 150.

The knowledge graph generator 110 may obtain data that describes previous projects, also referred to as previous project data, and generate a knowledge graph that represents relationships between the previous projects and skills needed for the previous projects. For example, the knowledge graph generator 110 may obtain project documents for a "Web Design Project" and generate a knowledge graph that indicates that the "Web Design Project" needs the skills of "Designer," "Web Developer," and "Web Tester."

The knowledge graph generator 110 may obtain the previous project data from a previous project database 112. For example, the previous project database 112 may include a server that stores project documentation include documentation for the "Web Design Project" or a project management platform that tracks one or more of timelines, skills, and costs, or other metrics, for projects in a standardized format. The previous project data may include database records for previous projects, documents previous projects, presentations used in previous projects, and other data regarding previous projects. The knowledge graph generator 110 may allow for data source management. For example, the knowledge graph generator 110 may provide a graphical user interface that provides selectable control elements that enable an administrator to select or de-select data sources to use as previous project data sources.

The knowledge graph generator 110 may perform an Extract, Transform and, Load (ETL) process on the obtained previous project data to normalize the data and inject the normalized data into the knowledge graph. For example, the knowledge graph generator 110 may use natural language processing on documents to identify the previous project that a document is associated with and skills referenced as needed by the documents.

In some implementations, the knowledge graph generator 110 may automatically determine when to perform ETL. For example, the knowledge graph generator 110 may detect changes in the previous project data or an addition of data for a recently completely project and, in response to detecting a change or addition, perform an ETL process on the changed or new previous project data to update the normalized data and generate an updated knowledge graph.

The knowledge graph generator 110 may generate a knowledge graph using the normalized previous project data. For example, the knowledge graph generator 110 may determine that the normalized data for the project "Web Design Project" indicated that the skills of "Designer," "Web Developer," and "Web Tester" were used, and in response, generate a knowledge graph that includes a node for "Web Design Project" that shares an edge with a node for "Skills" that shares edges with nodes for "Designer," "Web Developer," and "Web Tester." The knowledge graph generator 110 may automatically assign skills sets and roles in the right place of the knowledge graph. For example, "Web designed" may be automatically inserted under the concept "Web," with the property "has specification."

The knowledge graph generator 110 may include multiple previous projects within a same knowledge graph. For example, the knowledge graph generator 110 may obtain previous project data for project "Web Design Project" and previous project data for project "Mobile App Design Project," and include corresponding nodes for each of those projects and nodes for each of the skills needed by the projects. Nodes for skills used by multiple previous projects may have multiple edges that each connect to a node that corresponds to a particular one of the multiple previous projects. For example, the node for the skill "UX Designer" may have an edge to a node for the project "Web Design Project" and an edge to a node for the project "Mobile App Design Project." Nodes of previous projects that are related may be directly linked and nodes of previous projects that are not related may not be directly linked. For example, nodes for "Web Design Project" and "Mobile App Design Project" may not be linked but nodes for "Web Design Project" and "Mobile Web Design Project" may be linked.

The knowledge graph generator 110 may also generate nodes for parent skills of skills needed and link the nodes for parent skills to the skills needed by the previous projections. For example, nodes for skills "Web Tester" and "UI Tester" may both be connected to a node for the skill "Tester." The knowledge graph generator 110 may generate the nodes for parent skill and edges indicating relationships based on an ontology or well-structured knowledge base. For example, the knowledge graph generator 110 may access a skill ontology that indicates relationships between skills and, for each skill that is needed for a previous project, add the skills indicated as parents to the skill into the knowledge graph with corresponding edges.

In some implementations, the knowledge graph generator 110 may generate a knowledge graph that includes nodes representing other requirements for personnel. For example, the knowledge graph generator 110 may generate a knowledge graph that includes nodes representing knowledge in various topics needed for previous projects. Topics may include financial services, insurance, mortgages, mutual funds, telecommunications, education, agriculture, or other topics. The nodes for the other requirements may be connected to multiple nodes for previous projects, similarly to the skill nodes. The knowledge graph generator 110 may determine the topics of knowledge needed for a previous project similarly to as the knowledge graph generator 110 may determine the skills needed for a previous project. For example, the knowledge graph generator 110 may obtain previous project data, identify terms that indicate particular knowledge in a topic is needed for the previous project, and include nodes in the knowledge graph representing the topic with edges between the nodes and the node for the previous project.

The knowledge graph generator 110 may include time, man hours, and cost associated with each project. For example, in the node for the project "Web Design Project" the knowledge graph generator 110 may include data that describes that the project was split into three portions, the first portion used the skill "Designer," the second portion used the skills "Designer" and "Web Developer," and the third portion used the skills "Web Developer" and "Web Tester," and a time duration for each portion. Additionally or alternatively, the node for the project "Web Design Project" may indicate the number of man hours needed of each skill and the cost of completion for the project.

The knowledge graph generator 110 may generate the knowledge graph using human resource data. For example, the knowledge graph generator 110 may determine skills needed for the previous project by identifying personnel that worked on the previous project, identify the skills of those identified personnel, and determine that the identified skill of those identified personnel were needed for the previous project.

The project matching engine 120 may receive the knowledge graph and data describing a future project, also referred to as future project data, and select one or more previous projects that match the future project. For example, the project matching engine 120 may obtain project requirement documents for future project "Mobile Web Project" where the documents indicate that the skills of "UX Designer," "Web Tester," and "Node.JS" are needed and, in response, select that the previous project "Web Design Project" as a previous project that matches the future project "Mobile Web Project."

The project matching engine 120 may select the previous project that matches the future project based on generating similarity scores between the future project and the previous projects. The similarity scores may represent a similarity between the nodes and edges for two projects. For example, the project matching engine 120 may generate a similarity score of 0.9 that indicates a 90% similarity between the future project "Mobile Web Project" and a previous project "Web Design Project" and a similarity score of 0.1 that indicates a 10% similarity between the future project "Mobile Web Project" and a previous project "Call Center Upgrades."

In selecting the previous project that matches the future project, the project matching engine 120 may determine whether (i) the similarity score between the particular previous project and the future project is greater than or equal to the similarity score between other previous projects indicated by the knowledge graph and the future project and (ii) the similarity score between the particular previous project and the future project satisfies a similarity threshold. For example, the project matching engine 120 may determine that the similarity score of 0.9 between the future project "Mobile Web Project" and a previous project "Web Design Project" is the highest similarity score between the future project and any previous project, in response, determine that the similarity score of 0.9 is above a similarity threshold, e.g., 0.5, 0.7, or some other amount, and in response, select the previous project "Web Design Project" as matching the future project "Mobile Web Project."

In some implementations, the project matching engine 120 may generate the similarity scores between the future project and the previous project based on semantic distances between the future project and the previous project. For example, the project matching engine 120 may generate a knowledge graph for the future project or add the future project to the knowledge graph based on the future project data, and then determine a semantic distance between the nodes and edges for the future project and the nodes and edges for the previous project. Using the knowledge graph may enable the project matching engine 120 to efficiently match a future project to a previous project. For example, the project matching engine 120 may add a node for the future project into the knowledge graph with the previous projects, link any nodes for skills needed for the future project that are already in the knowledge graph to the node for the future project, add any nodes for skills needed for the future project that are not already in the knowledge graph and link those nodes to the node for the future project, identify previous projects that are within a predetermined number of hops, e.g., two, three, or some other number, away from the future project, and then generate similarity scores for just the identified previous projects.

The project matching engine 120 may generate the similarity score based on the number of exact matches of parameters, e.g., skills and topics, indicated by the knowledge graph between the previous project and the future project and the amount of differences between non-matching parameters. For example, a previous project that used the topic "insurance" and the skill "Designer" and a future project that uses the topic "insurance" and the skill "Web Tester" may have a 50% match, a previous project that used the topic "insurance" and the skill "Designer" and a future project that uses the topic "financial services" and the skill "Designer" may have a 75% match, and a previous project that used the topic "insurance" and the skill "Designer" and a future project that uses the topic "insurance" and the skill "Designer" may have a 100% match.

In some implementations, the future project data may be explicit requirements, e.g., skills, timeline, topics, specified by a user through a user interface to be provided as parameters to the project matching engine 120. In some implementations, the future project data may be future project documentation provided to the project matching engine 120 which then performs an ETL process to normalize the future project data.

The missing skill detector 130 may receive a selected previous project from the project matching engine 120 and determine skills that are missing in a workforce. For example, the missing skill detector 130 may determine that for the skill of "Node.JS" required for the future project, no personnel within the company has the skill. This scenario may occur when skills needed for future projects may be skills that are new to the company. In another example, the missing skill detector 130 may determine that for the skill of "UX Designer" for the future project, personnel within the company do have the skill.

Figure 3:
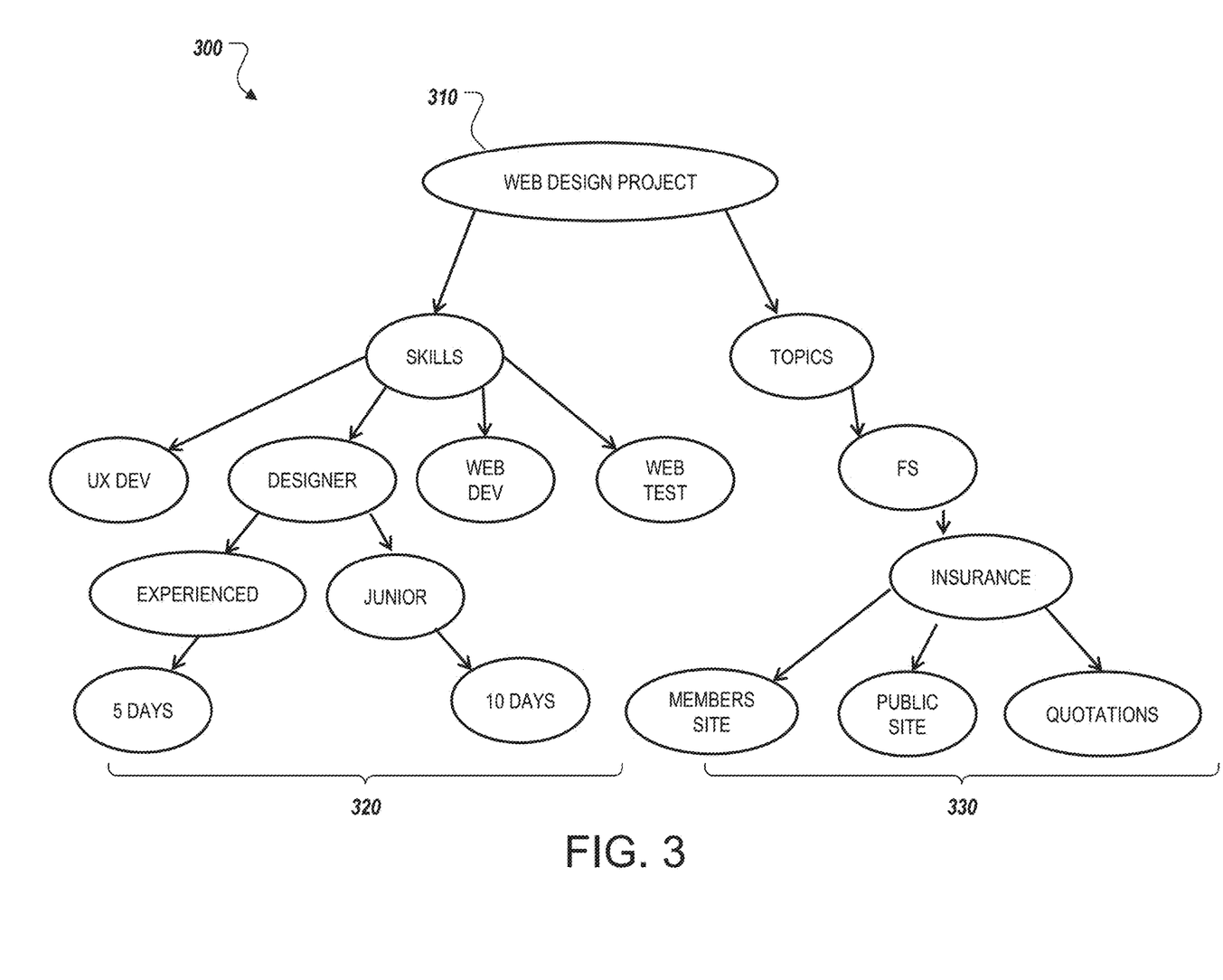
FIG. 3 is an example knowledge graph representing projects and skills.

When missing skills are identified, the original knowledge graph in FIG. 3 may be augmented with external information related to skills and their application domain. Any new skills may be connected using external information from external projects (e.g., through project descriptions available on the Internet or external skills trends per project categories), to the existing skills of the initial knowledge graph. For instance the "Node.JS" skill may be connected to the "UX DEV" skill. By using the extended knowledge graph, the system can determine the closest skills set to new skills. In other words any new skill may be connected to the knowledge graph through a node from which semantic similarity can be evaluated. The closest nodes (e.g., skills) with respect to the below formula can be automatically retrieved. The higher the value of $\Delta(S_i, S_j)$ the stronger the semantic similarity.

$$\Delta(S_i, S_j) = \frac{1}{1 + d(S_i + S_j)}$$

where $S_i$=an entity in knowledge graph, $S_j$=an entity in knowledge graph, and d=the number of edges between the semantic entities in the knowledge graph.

The personnel identification engine 140 may obtain the skills needed from the missing skill detector 130 and identify personnel for the future project. For example, the personnel identification engine 140 may determine that the skills "UX Designer" and "Web Developer" were needed for the previous particular project, determine that "John Doe" possesses those skills, in response, determine that "John Doe" is available during the time period that the future project data specifies work on the future project is to occur, and in response, recommend that "John Doe" work on the future project.

In the context of missing skills, the formula above may be used to identify proximate skills in the knowledge graph, and then identify personnel with such skills, or with proximate skills.

The personnel identification engine 140 may identify the personnel for the future project based on human resource data 142. Human resource data 142 may include data from a human resource database that describes one or more of personnel, skills possessed by the personnel, availability of the personnel, cost of the personnel, and other information about the personnel.

The personnel identification engine 140 may identify the personnel by selecting a set of personnel that cover more of the skills determined to be needed for the future project and reduce the amount of cost of personnel. For example, the personnel identification engine 140 may identify "John Doe" over "Jane Doe" for a future project as both may cover the same skills needed by the future project and "Jane Doe" may have a higher salary than "John Doe." In another example, the personnel identification engine 140 may identify "Jane Doe" over "John Doe" as "Jane Doe" may cover three skills needed for the future project and "John Doe" may cover one skill needed for the future project. A similar process can be applied for optimizing resource location, e.g., minimizing distance between office location of personnel.

The resource plan generator 150 may generate the resource plan for a future project based on the skills needed for the previous project identified as matching the future project, the skills indicated as missing by the missing skill detector 130, and the personnel identified by the personnel identification engine 140. For example, the resource plan generator 150 may obtain an identification "John Doe" and "Jane Doe" for a future project and generate a resource plan that indicates that the set of "John Doe" and "Jane Doe" are recommended for the future project, the skill "Web Tester" is needed for the future project but no personnel in the company is available at that time, and that the skill "Node.JS" is needed but no personnel within the company has that skill.

The resource plan generator 150 may provide the resource plan for display to a user. For example, the resource plan generator 150 may provide the resource plan over a network to a computing device used by a user for the computing device to display the resource plan to the user.

In some implementations, the resource plan generator 150 may provide the resource plan by generating an exemplar electronic document. In some examples, an exemplar electronic document can be provided as a template that includes fields for an estimated duration, recommended personnel, skills possessed by employees but unavailable during the project, and skills not possessed by employees, and values for each of the fields. The values may be populated based on the determinations made by the strategy engine 150 as described above.

In some implementations, the system 100 may enable the user to modify the resource plan. For example, the system 100 may provide a graphical user interface on a device of the user to enable the user to provide user inputs to not include a particular person in the set of identified personnel, include a particular person in the set of identified personnel, request personnel within a particular geographic area, or some other input. The personnel identification engine 140 may then receive those inputs to select a new set of personnel for the future project and the resource plan generator 150 may then generate a new resource plan based on the new set of personnel.

In some implementations, the system 100 may use machine-learning based on feedback from a user. For example, the system 100 may provide a graphical user interface on a device of the user that enables the user to provide user inputs to indicate that a skill indicated as needed for a previous project was not actually needed, a previous project determined to match a future project does not actually match the future project, a future project does not actually need skills, or some other input and the system 100 may then learn from the inputs.

Different configurations of the system 100 may be used where functionality of the knowledge graph generator 110, the project matching engine 120, the missing skill detector 130, the personnel identification engine 140, and the resource plan generator 150 may be combined, further separated, distributed, or interchanged. For example, the functionality of the project matching engine 120 and the missing skill detector 130 may be combined in a single engine.

Figure 2:
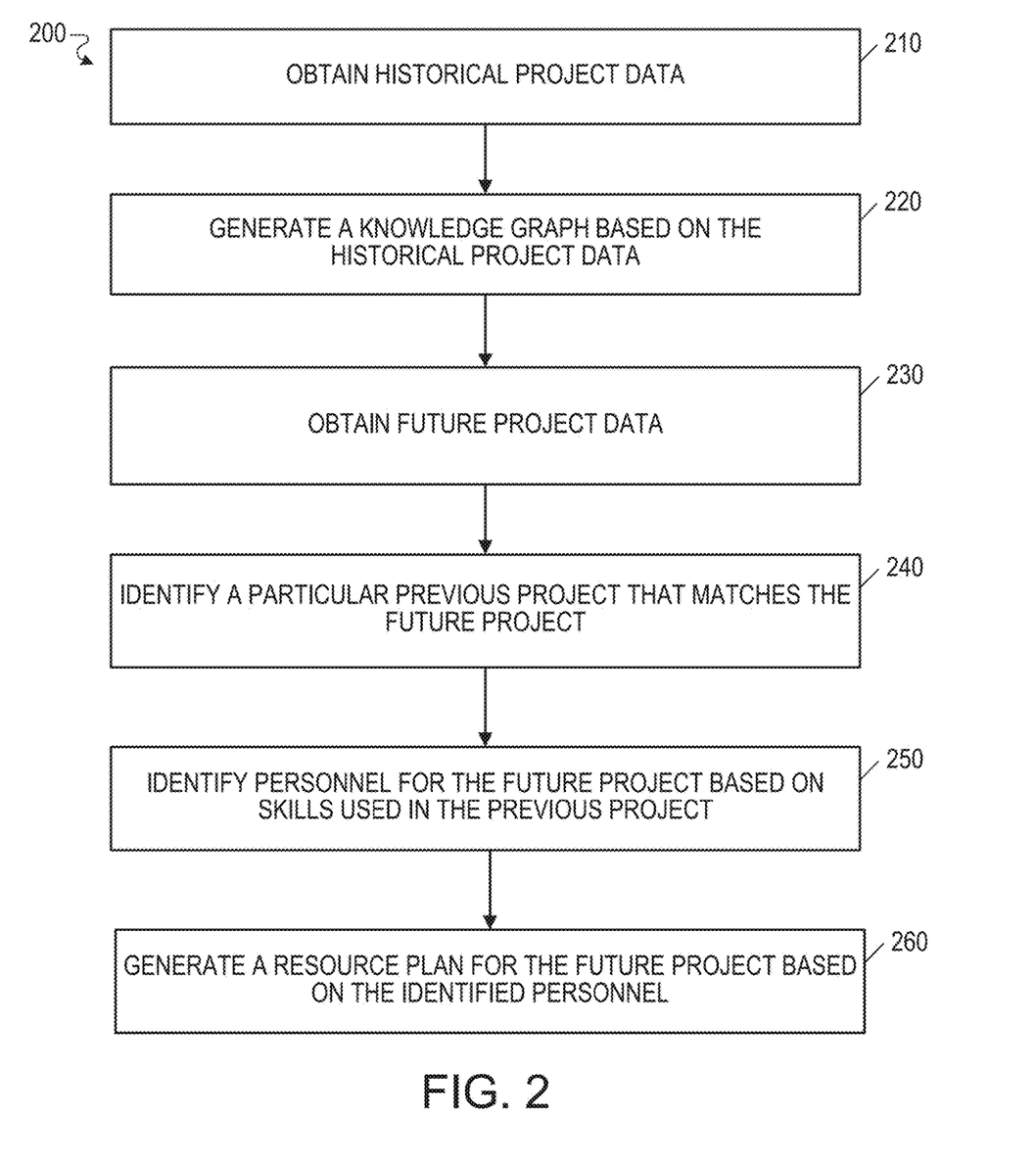
FIG. 2 is a flowchart of an example process that can execute implementations of the present disclosure.

FIG. 2 is a flowchart of an example process 200 that can execute implementations of the present disclosure. The following describes the process 200 as being performed by components of the systems 100 that are described with reference to FIG. 1. However, the process 200 may be performed by other systems or system configurations.

The process 200 may include obtaining historical project data (210). For example, the knowledge graph generator 110 may obtain previous project data from a database that stores previous project documentations that are non-standardized, a project management platform that stores data describing timelines, costs, and requirements of projects in standardized records, and a human resource database that describes skills possessed by personnel and personnel that worked on previous projects. All relationships may have a semantic description attached. In other words, edges may have different interpretations whether they connect skills, projects, or skills and projects.

The process 200 may include generating a knowledge graph based on the historical project data (220). For example, the knowledge graph generator 110 may perform an ETL process on the obtained historical project data and generate a knowledge graph that includes nodes that represent previous projects, nodes that represent skills used for the previous projects, and edges between the nodes that represent relationships between the nodes.

The process 200 may include obtaining future project data (230). For example, the project matching engine 120 may obtain future project data for "Project X" from explicit inputs from a user specifying parameters for the future project or from performing an ETL process on future project documentation. In obtaining the future project data, the project matching engine 120 may generate a knowledge graph for the future project or add the future project to the knowledge graph including the previous projects.

The process 200 may include identifying a particular project that matches the future project (240). For example, the project matching engine 120 may determine that a particular previous project "Y" matches future project "X" based on determining that a similarity score, between the projects calculated based on their semantic distance in the knowledge graph, (i) indicates greater similarity between the future project and any other particular previous project and (ii) satisfies a similarity threshold.

The process 200 may include identifying personnel for the future project based on the skills used in the previous project (250). For example, the personnel identification engine 140 may determine that the particular previous project used a particular set of skills and then use human resource data to identify a set of personnel that together have the set of skills used in the particular previous project and are available during the future project.

The process 200 may include generating a resource plan for the future project based on the identified personnel (260). For example, the resource plan generator 150 may obtain the set of identified personnel for future project "X," receive an indication that "Skill A" is possessed by employees in the company but none are available for future project X," receive an indication that "Skill B" is not possessed by any employee within the company, and generate user interface that includes the indications and the set of identified personnel for display on a user device.

FIG. 3 is an example knowledge graph 300 representing projects and skills. A knowledge graph is a collection of data representing entities and relationships between entities. The data is logically described as a graph, in which each distinct entity is represented by a respective node and each relationship between a pair of entities is represented by an edge between the nodes. Each edge is associated with a relationship and the existence of the edge represents that the associated relationship exists between the nodes connected by the edge. For example, if a node A represents a person alpha, a node B represents a person beta, and an edge E is associated with the relationship "is the father of," then having the edge E connect the nodes in the direction from node A to node B in the graph represents the fact that alpha is the father of beta.

A knowledge graph can be represented by any of a variety of convenient physical data structures. For example, a knowledge graph can be represented by triples that each represent two entities in order and a relationship from the first to the second entity; for example, [alpha, beta, is the father of], or [alpha, is the father of, beta], are alternative ways of representing the same fact. Each entity and each relationship can be and generally will be included in multiple triples.

Alternatively, each entity can be stored as a node once, as a record or an object, for example, and linked through a linked list data structure to all the relationships the entity has and all the other entities to which the entity is related. More specifically, a knowledge graph can be stored as an adjacency list in which the adjacency information includes relationship information.

It is generally advantageous to represent each distinct entity and each distinct relationship with a unique identifier.

The entities represented by a knowledge graph need not be tangible things or specific people. The entities can include particular people, places, things, artistic works, concepts, events, or other types of entities. Thus, a knowledge graph can include data defining relationships between people, e.g., co-stars in a movie; data defining relationships between people and things, e.g., a particular singer recorded a particular song; data defining relationships between places and things, e.g., a particular type of wine comes from a particular geographic location; data defining relationships between people and places, e.g., a particular person was born in a particular city; and other kinds of relationships between entities.

In some implementations, each node has a type based on the kind of entity the node represents; and the types can each have a schema specifying the kinds of data that can be maintained about entities represented by nodes of the type and how the data should be stored. So, for example, a node of a type for representing a person could have a schema defining fields for information such as birth date, birth place, and so on. Such information can be represented by fields in a type-specific data structure, or by triples that look like node-relationship-node triples, e.g., [person identifier, was born on, date], or in any other convenient predefined way. Alternatively, some or all of the information specified by a type schema can be represented by links to nodes in the knowledge graph; for example, [one person identifier, child of, another person identifier], where the other person identifier is a node in the graph.

As shown in FIG. 3, node 310 represents a previous project "Web Design Project," nodes 320 represent skills required for the previous project and other information about the skills, nodes 330 represent topics of knowledge required for the previous project and other information about the topics of knowledge, and the edges between the various nodes represent relationships between the nodes. For example, the knowledge graph 300 indicates that the skills "UX Designer," "Designer," "Web Developer," "Web Tester" and knowledge in the topic "insurance" were needed for the previous project "Web Design Project," and that the amount of work for the skill "Designer" could be completed by someone that is "Experienced" in five days and completed by someone that is "Junior" in ten days.

Figure 4:
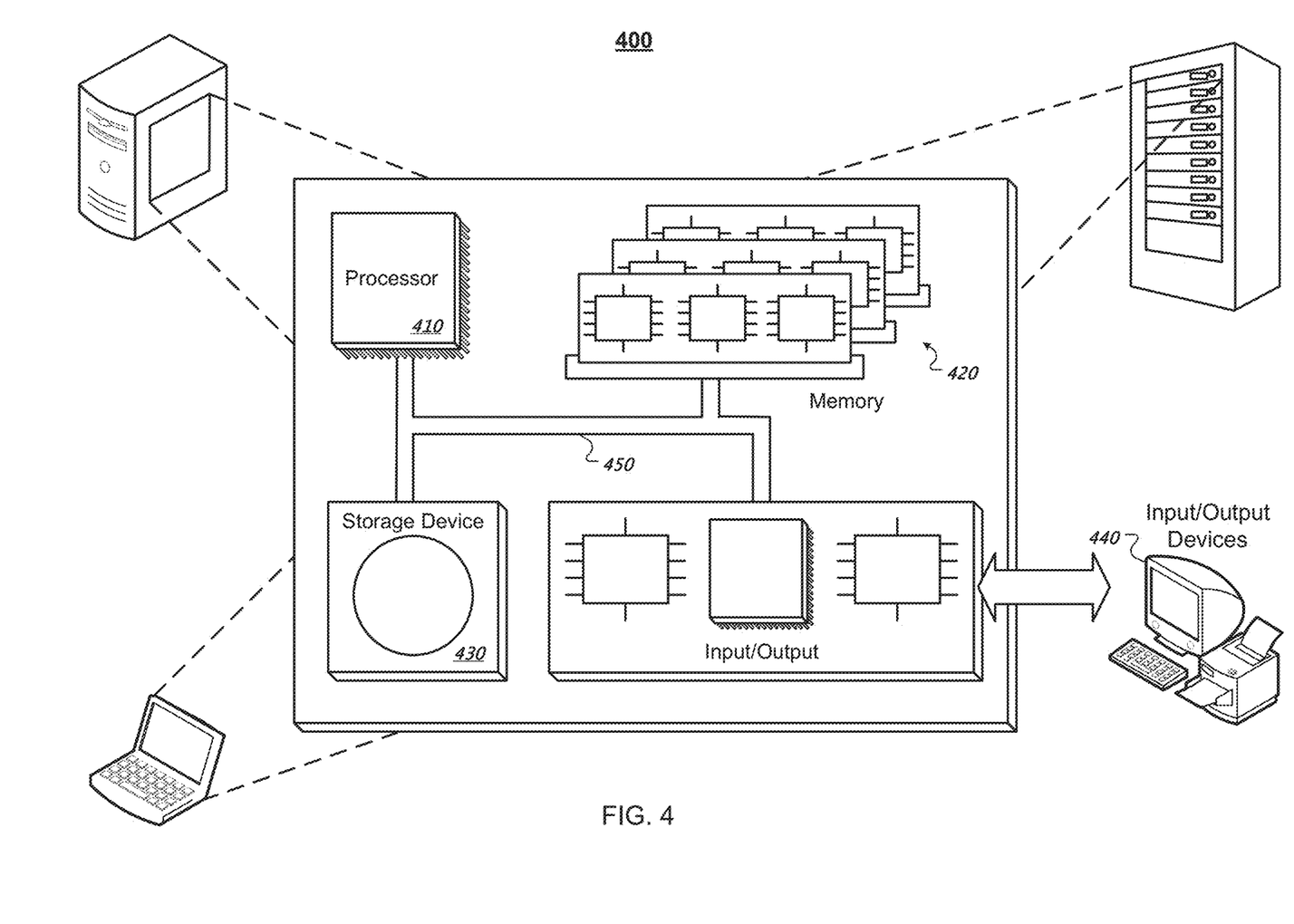
FIG. 4 illustrates a schematic diagram of an exemplary generic computer system.

FIG. 4 illustrates a schematic diagram of an exemplary generic computer system. The system 400 can be used for the operations described in association with the processes 200 according to some implementations. The system 400 may be included in the system 100.

The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps may be provided, or steps may be eliminated, from the described processes. Accordingly, other implementations are within the scope of the following claims.

The invention claimed is:

1. A computer-implemented method performed by one or more computers comprising:
obtaining, by a knowledge graph generator and from a database, historical project data describing previous projects;
generating, by the knowledge graph generator, a knowledge graph based at least on the historical project data, where the knowledge graph represents relationships between nodes for the previous projects and nodes for skills needed for the previous projects, wherein each edge between a node for a previous project and a node for a skill indicates that the skill is needed by the previous project;
obtaining, by a project matching engine, input from a user through a graphical user interface on a device of the user, where the input specifies future project data describing a future project;
adding, by the project matching engine and into the knowledge graph based on the future project data, both (i) a node for the future project and (ii) edges between the node for the future project and the nodes for skills needed by the previous projects, wherein each edge that is added between the node for the future project and a node for a skill needed by a previous project indicates that the skill is needed by both the future project and the previous project;
determining, by the project matching engine, that the nodes for a subset of the previous projects are within a predetermined number of hops from the node for the future project;
in response to determining that the nodes for the subset of the previous projects are within the predetermined number of hops from the node for the future project, generating, by the project matching engine, similarity scores between the subset of previous projects and the future project based on both (i) a distance in the knowledge graph between the node for the future project and nodes for the subset of previous projects and (ii) a number of matches between the skills needed by future project and the skills needed by the previous projects, wherein each match is identified based on identifying that the knowledge graph includes edges to a node for a skill from both the node for the future project and a node for a previous project;

determining, by the project matching engine, that the similarity score between a particular previous project of the subject of previous projects and the future project satisfies a similarity threshold;

in response to determining that the similarity score between the particular previous project and the future project satisfies the similarity threshold, identifying, by the project matching engine, the particular previous project as matching the future project;

identifying, by a personnel identification engine, personnel for the future project based at least on the skills needed for the particular previous project and personnel data obtained from a human resource database that specifies skills of the personnel; and generating, by a resource plan generator, a resource plan for the future project based at least on the identified personnel; and providing the resource plan for display to the user in response to the input from the user.

2. The method of claim 1, wherein determining that the similarity score between a particular previous project of the subject of previous projects and the future project satisfies a similarity threshold comprises:

determining that (i) the similarity score between the particular previous project and the future project is greater than or equal to the similarity score between other previous projects indicated by the knowledge graph and the future project and (ii) the similarity score between the particular previous project and the future project satisfies the similarity threshold, wherein identifying personnel for the future project based at least on the skills needed for the particular previous project comprises in response to determining that (i) the similarity score between the particular previous project and the future project is greater than or equal to the similarity score between other previous projects indicated by the knowledge graph and the future project and (ii) the similarity score between the particular previous project and the future project satisfies the similarity threshold, identifying the particular previous project as matching the future project.

3. The method of claim 1, wherein generating a knowledge graph based at least on the historical project data, where the knowledge graph represents relationships between nodes for the previous projects and nodes for skills needed for the previous projects comprises:

identifying a set of the historical project data corresponds to the particular previous project;

identifying skills referenced by the set of the historical project data; and including, in the knowledge graph, a node that represents the particular previous project, nodes that represent the identified skills, and edges between the node that represents the particular previous project and the nodes the represent the identified skills that represent relationships between the particular previous project and the identified skills.

4. The method of claim 1, wherein identifying personnel for the future project based at least on the skills needed for the particular previous project comprises:

obtaining the personnel data that describes skills possessed by personnel and future availability of the personnel; and identifying, based on the personnel data, a set of personnel that at least a portion of the skills needed for the particular previous project that are available while work is to be performed for the future project.

5. The method of claim 4, wherein identifying, based on the personnel data, a set of personnel that at least a portion of the skills needed for the particular previous project that are available while work is to be performed for the future project comprises reducing cost for the personnel while increasing coverage of skills needed for the particular previous project.

6. The method of claim 1, comprising identifying skills that are needed for the future project that are not needed for the particular previous project, wherein identifying personnel for the future project based at least on the skills needed for the particular previous project comprises identifying personnel for the future project based at least on the skills needed for the particular previous project and the skills that are identified as (i) needed for the future project and (ii) not needed for the particular previous project.

7. The method of claim 1, wherein generating a resource plan for the future project based at least on the identified personnel comprises:

generating data that describes that the identified personnel are recommended for working on the future project, describe skills that are not satisfied by the identified personnel but available within a company, and skills that are not available within the company.

8. The method of claim 1, comprising:

providing an exemplar electronic document based on the resource plan for display to a user in a graphical user interface.

9. The method of claim 1, wherein generating a knowledge graph based at least on the historical project data, where the knowledge graph represents relationships between nodes for the previous projects and nodes for skills needed for the previous projects comprises:

generating the knowledge graph based at least on the historical project data, and external data from relationships between skills and projects, where the knowledge graph represents relationships between the previous projects and skills needed for the previous internal and external projects.

10. The method of claim 1, wherein generating similarity scores between the previous projects and the future project based on both (i) a distance in the knowledge graph between the node for the future project and nodes for the subset of previous projects and (ii) a number of matches between the skills needed by future project and the skills needed by the previous projects comprises:

generating a particular similar score between a particular previous project and the future project based on semantic distances between nodes and edges for the particular previous project and nodes and edges for the future project.

11. The method of claim 1, wherein generating similarity scores between the previous projects and the future project based on both (i) a distance in the knowledge graph between the node for the future project and nodes for the subset of previous projects and (ii) a number of matches between the skills needed by future project and the skills needed by the previous projects comprises:

determining a proportion of the skills needed by the future project that match the skills needed by a particular previous project; and generating the similarity score between the future project and the particular previous project based on the proportion of the skills needed by the future project that match the skills needed by a particular previous project.

12. The method of claim 1, comprising:

determining that a first particular skill needed by the future project is a new skill that was not required by the previous projects; and identifying, with the knowledge graph, a second particular skill needed by a particular previous project that is close to the first particular skill.

13. A system comprising:

one or more computers and one or more storage devices storing instructions that are operable, when executed by the one or more computers, to cause the one or more computers to perform operations comprising:

obtaining, by a knowledge graph generator and from a database, historical project data describing previous projects;

generating, by the knowledge graph generator, a knowledge graph based at least on the historical project data, where the knowledge graph represents relationships between nodes for the previous projects and nodes for skills needed for the previous projects, wherein each edge between a node for a previous project and a node for a skill indicates that the skill is needed by the previous project;

obtaining, by a project matching engine, input from a user through a graphical user interface on a device of the user, where the input specifies future project data describing a future project;

adding, by the project matching engine and into the knowledge graph based on the future project data, both (i) a node for the future project and (ii) edges between the node for the future project and the nodes for skills needed by the previous projects, wherein each edge that is added between the node for the future project and a node for a skill needed by a previous project indicates that the skill is needed by both the future project and the previous project;

determining, by the project matching engine, that the nodes for a subset of the previous projects are within a predetermined number of hops from the node for the future project;

in response to determining that the nodes for the subset of the previous projects are within the predetermined number of hops from the node for the future project, generating, by the project matching engine, similarity scores between the subset of previous projects and the future project based on both (i) a distance in the knowledge graph between the node for the future project and nodes for the subset of previous projects and (ii) a number of matches between the skills needed by future project and the skills needed by the previous projects, wherein each match is identified based on identifying that the knowledge graph includes edges to a node for a skill from both the node for the future project and a node for a previous project;

determining, by the project matching engine, that the similarity score between a particular previous project of the subject of previous projects and the future project satisfies a similarity threshold;

in response to determining that the similarity score between the particular previous project and the future project satisfies the similarity threshold, identifying, by the project matching engine, the particular previous project as matching the future project;

identifying, by a personnel identification engine, personnel for the future project based at least on the skills needed for the particular previous project and personnel data obtained from a human resource database that specifies skills of the personnel; and generating, by a resource plan generator, a resource plan for the future project based at least on the identified personnel; and providing the resource plan for display to the user in response to the input from the user.

14. The system of claim 13, wherein determining that the similarity score between the particular previous project and the future project satisfies a similarity threshold comprises:

determining that (i) the similarity score between the particular previous project and the future project is greater than or equal to the similarity score between other previous projects indicated by the knowledge graph and the future project and (ii) the similarity score between the particular previous project and the future project satisfies the similarity threshold, wherein identifying personnel for the future project based at least on the skills needed for the particular previous project comprises in response to determining that (i) the similarity score between the particular previous project and the future project is greater than or equal to the similarity score between other previous projects indicated by the knowledge graph and the future project and (ii) the similarity score between the particular previous project and the future project satisfies the similarity threshold, identifying the particular previous project as matching the future project.

15. The system of claim 13, wherein generating a knowledge graph based at least on the historical project data, where the knowledge graph represents relationships between nodes for the previous projects and nodes for skills needed for the previous projects comprises:

identifying a set of the historical project data corresponds to the particular previous project;

identifying skills referenced by the set of the historical project data; and including, in the knowledge graph, a node that represents the particular previous project, nodes that represent the identified skills, and edges between the node that represents the particular previous project and the nodes the represent the identified skills that represent relationships between the particular previous project and the identified skills.

16. The system of claim 13, wherein identifying personnel for the future project based at least on the skills needed for the particular previous project comprises:

obtaining the personnel data that describes skills possessed by personnel and future availability of the personnel; and identifying, based on the personnel data, a set of personnel that at least a portion of the skills needed for the particular previous project that are available while work is to be performed for the future project.

17. The system of claim 16, wherein identifying, based on the personnel data, a set of personnel that at least a portion of the skills needed for the particular previous project that are available while work is to be performed for the future project comprises reducing cost for the personnel while increasing coverage of skills needed for the particular previous project.

18. The system of claim 13, comprising identifying skills that are needed for the future project that are not needed for the particular previous project, wherein identifying personnel for the future project based at least on the skills needed for the particular previous project comprises identifying personnel for the future project based at least on the skills needed for the particular previous project and the skills that are identified as (i) needed for the future project and (ii) not needed for the particular previous project.

19. A non-transitory computer-readable medium storing software comprising instructions executable by one or more computers which, upon such execution, cause the one or more computers to perform operations comprising:

obtaining, by a knowledge graph generator and from a database, historical project data describing previous projects;

generating, by the knowledge graph generator, a knowledge graph based at least on the historical project data, where the knowledge graph represents relationships between nodes for the previous projects and nodes for skills needed for the previous projects, wherein each edge between a node for a previous project and a node for a skill indicates that the skill is needed by the previous project;

obtaining, by a project matching engine, input from a user through a graphical user interface on a device of the user, where the input specifies future project data describing a future project;

adding, by the project matching engine and into the knowledge graph based on the future project data, both (i) a node for the future project and (ii) edges between the node for the future project and the nodes for skills needed by the previous projects, wherein each edge that is added between the node for the future project and a node for a skill needed by a previous project indicates that the skill is needed by both the future project and the previous project;

determining, by the project matching engine, that the nodes for a subset of the previous projects are within a predetermined number of hops from the node for the future project;

in response to determining that the nodes for the subset of the previous projects are within the predetermined number of hops from the node for the future project, generating, by the project matching engine, similarity scores between the subset of previous projects and the future project based on both (i) a distance in the knowledge graph between the node for the future project and nodes for the subset of previous projects and (ii) a number of matches between the skills needed by future project and the skills needed by the previous projects, wherein each match is identified based on identifying that the knowledge graph includes edges to a node for a skill from both the node for the future project and a node for a previous project;

determining, by the project matching engine, that the similarity score between a particular previous project of the subject of previous projects and the future project satisfies a similarity threshold;

in response to determining that the similarity score between the particular previous project and the future project satisfies the similarity threshold, identifying, by the project matching engine, the particular previous project as matching the future project;

identifying, by a personnel identification engine, personnel for the future project based at least on the skills needed for the particular previous project and personnel data obtained from a human resource database that specifies skills of the personnel; and generating, by a resource plan generator, a resource plan for the future project based at least on the identified personnel; and providing the resource plan for display to the user in response to the input from the user.

* * * * *